United States Patent
Gao et al.

(10) Patent No.: US 10,890,776 B1
(45) Date of Patent: Jan. 12, 2021

(54) PANCAKE LENS GHOSTING MITIGATION

(71) Applicant: Facebook Technologies, LLC, Menlo Park, CA (US)

(72) Inventors: Weichuan Gao, Redmond, WA (US); Marina Zannoli, Redmond, WA (US); Yusufu Njoni Bamaxam Sulai, Bothell, WA (US); Kara Emery, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 32 days.

(21) Appl. No.: 16/279,843

(22) Filed: Feb. 19, 2019

(51) Int. Cl.
*G02B 27/01* (2006.01)
*G02B 27/28* (2006.01)
*G02B 27/00* (2006.01)

(52) U.S. Cl.
CPC ....... *G02B 27/286* (2013.01); *G02B 27/0172* (2013.01); *G02B 27/0093* (2013.01); *G02B 2027/0123* (2013.01)

(58) Field of Classification Search
CPC .. G02B 27/01; G02B 27/0101; G02B 27/017; G02B 27/0172; G02B 27/286
See application file for complete search history.

(56) References Cited

U.S. PATENT DOCUMENTS

| | | | | |
|---|---|---|---|---|
| 6,271,969 | B1* | 8/2001 | Mertz | G02B 27/0172 359/489.07 |
| 10,642,048 | B2* | 5/2020 | Peng | G02F 1/133528 |
| 2018/0101020 | A1* | 4/2018 | Gollier | G02B 27/022 |
| 2019/0377176 | A1* | 12/2019 | Sharp | G02B 27/0172 |
| 2019/0377184 | A1* | 12/2019 | Sharp | G02B 27/286 |
| 2020/0049872 | A1* | 2/2020 | Peng | G02B 27/01 |
| 2020/0096817 | A1* | 3/2020 | Richards | G02B 27/0179 |

\* cited by examiner

*Primary Examiner* — William C. Dowling
(74) *Attorney, Agent, or Firm* — Pequinot + Myers; Matthew A. Pequignot

(57) ABSTRACT

A near-eye display assembly includes an electronic display for providing image light, a circular polarizer disposed downstream of the electronic display for circularly polarizing the image light, and a pancake lens disposed downstream of the circular polarizer for conveying the image light to an eyebox of the near-eye display. The circular polarizer includes a quarter-wave waveplate disposed between the electronic display and the pancake lens, and spaced apart from the electronic display and the pancake lens, to additionally defocus ghost image artifacts at the eyebox.

16 Claims, 12 Drawing Sheets

PANCAKE LENS GHOSTING MITIGATION

TECHNICAL FIELD

The present disclosure relates to visual displays, and in particular to near-eye displays, their components, modules, and related methods.

BACKGROUND

Head-mounted displays (HMDs) and other wearable displays are becoming more commonly used as faster computing systems and smaller electronic display devices are developed. HMDs often include optical components placed near eyes of a user. Display systems with optical components placed near user's eyes are termed near-eye displays (NEDs). NEDs are typically worn by a user, although they may also be stationary.

NEDs can be used to present virtual scenery to a user. Such displays are called virtual reality (VR) displays. Some NEDs may augment real scenery with dynamic information, data, or virtual objects, providing so-called augmented reality (AR). The latter displays are termed AR displays. Optics of AR/VR NEDs are often constructed to have a wide field of view (FOV) to match a natural field of view of a human eye.

It is desirable to reduce size and weight of an NED to reduce the strain on user's head and neck. Lighter NEDs are generally more comfortable to wear. Oftentimes, the optics block of a wearable display is the bulkiest and heaviest module of the headset. Compact optical components, such as waveguides, gratings, Fresnel lenses, pancake lenses, etc., may be used to reduce the size and weight of the optics block. However, compact optics may be prone to distortions, non-uniformity, ghost image formation, residual coloring, and other drawbacks. These drawbacks may hinder the use of compact optics in wearable display systems.

BRIEF DESCRIPTION OF THE DRAWINGS

Exemplary embodiments will now be described in conjunction with the drawings, in which.

DETAILED DESCRIPTION

Figure 1:
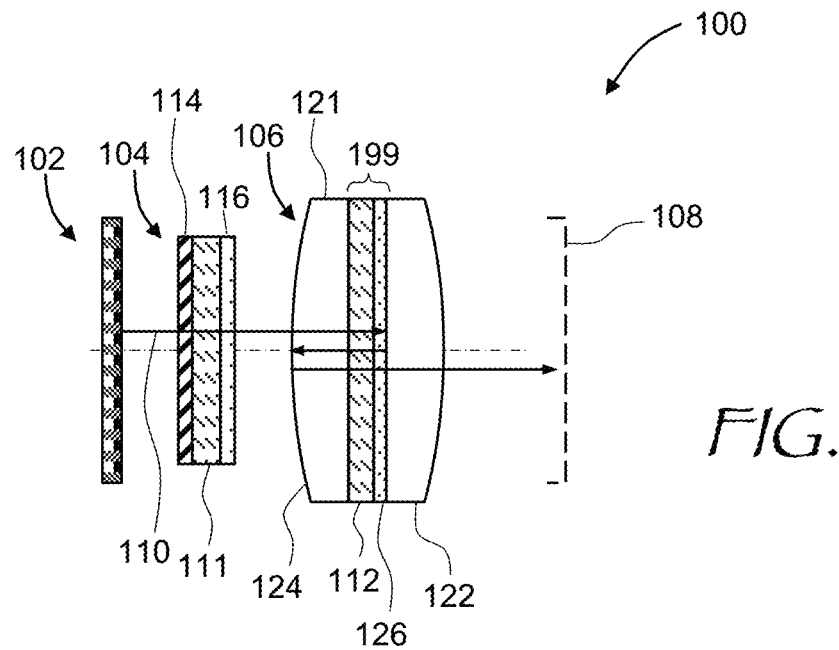
FIG. 1 is a side cross-sectional view of an example embodiment of a near-eye display assembly including a pancake lens.

While the present teachings are described in conjunction with various embodiments and examples, it is not intended that the present teachings be limited to such embodiments and examples. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 5, 8A, and 8B, similar reference numerals refer to similar elements.

A near-eye display may use a folded-path lens with refractive and reflective surfaces. The optical path folding is achieved by using polarization-selective optics, for example waveplates, transmissive polarizers, reflective polarizers, etc. Such a folded-path lens is commonly termed "pancake lens" due to its multi-layer construction. The folded-path configuration of a pancake lens results in a compact structure conveying an image generated by an electronic display in a wide field of view.

Folded beam path configurations may sometimes produce secondary beam paths creating so-called ghost images or ghost artifacts at the eyebox of the display. In particular, Fresnel reflections from a top surface of a polarization stack laminated onto the electronic display may create multiple near-focus ghost artifacts that degrade the quality of images perceived by the users. Although ghost artifacts are typically out-of-focus and appear dimmer than the main image, they can be distracting to the viewer. Furthermore, ghost artifacts may reduce image contrast, color fidelity, and sharpness of an image being displayed to the viewer.

In accordance with the present disclosure, ghost images may be controlled by mitigating reflections in the vicinity of the electronic display. For example, a quarter-wave waveplate used in a pancake lens to manipulate polarization is usually placed, i.e. laminated or bonded, directly on the electronic display. This is done for convenience, as a flat top surface of the display provides suitable support. In accordance with the present disclosure, the quarter-wave waveplate may be moved away from the electronic display towards a nearest curved surface of the pancake lens. An air gap may remain between the curved surface and the quarter-wave waveplate. The quarter-wave waveplate may be tilted and/or curved. Such a construction can result in further defocusing of possible ghost artifacts.

In accordance with the present disclosure, there is provided a near-eye display assembly comprising an electronic display for providing image light, a circular polarizer downstream of the electronic display for circularly polarizing the image light, and a pancake lens downstream of the circular polarizer for conveying the image light to an eyebox. The circular polarizer comprises a quarter-wave waveplate disposed between and spaced apart from the electronic display and the pancake lens.

In some embodiments, the circular polarizer is spaced apart from the electronic display and the pancake lens by air gaps. The circular polarizer may be tilted w.r.t. an optical axis of the pancake lens. The circular polarizer may have curved outer optical surfaces, such that the circular polarizer has a substantially zero optical power for transmitted light.

In embodiments where the pancake lens comprises a pair of plano-convex lenses and a stack of a second quarter-wave waveplate and a reflective polarizer sandwiched between flat sides of the pair of plano-convex lenses, the quarter-wave waveplate may be disposed closer to the pancake lens than to the electronic display. In embodiments where the pancake lens comprises a pair of plano-convex lenses with convex sides facing the electronic display, a second quarter-wave waveplate, and a reflective polarizer disposed downstream of the pair of plano-convex lenses, the quarter-wave waveplate may be disposed within 25% of the middle between the electronic display and the pancake lens.

The quarter-wave waveplate may include an anti-reflective coating facing the pancake lens. The anti-reflective coating has reflectivities at wavelengths of red, green, and blue color channels differing by less than 50% of the reflectivity at the wavelength of the green color channel. The circular polarizer may further include a linear polarizer upstream of and in contact with the quarter-wave waveplate.

In accordance with the present disclosure, there is provided an optical assembly comprising a polarization stack and a pancake lens subassembly separated from the polarization stack by an air gap. The polarization stack may include in sequence: an air-facing linear polarizer, a first quarter-wave waveplate in contact with the linear polarizer, and an air-facing anti-reflective coating on a surface of the first quarter-wave waveplate facing the pancake lens subassembly. A transmission axis of the linear polarizer may be disposed at 45 degrees w.r.t. an optic axis of the first quarter-wave waveplate. The pancake lens subassembly may include a first plano-convex lens having a partially reflective coating on its convex side facing the polarization stack.

In some embodiments, the pancake lens subassembly further includes in sequence: a second quarter-wave waveplate in contact with a flat side of the first plano-convex lens, a reflective polarizer having a transmission axis at 45 degrees w.r.t. an optic axis of the second quarter-wave waveplate, and a second plano-convex lens having a flat side in contact with the reflective polarizer. In some embodiments, the pancake lens subassembly further comprises a second plano-convex lens having a convex side facing towards the polarization stack, a second quarter-wave waveplate, and a reflective polarizer downstream of the second quarter-wave waveplate and in contact with a flat side of the second plano-convex lens, the reflective polarizer having a transmission axis at 45 degrees w.r.t. an optic axis of the second quarter-wave waveplate.

In accordance with the present disclosure, there is further provided a method for coupling image light emitted by an electronic display to an eyebox of a near-eye display. The method includes circularly polarizing the image light by a circular polarizer comprising a quarter-wave waveplate spaced apart from the electronic display, to produce circularly polarized image light, and conveying the circularly polarized image light to the eyebox by a pancake lens spaced by an air gap from the quarter-wave waveplate. In some embodiments, the circular polarizer is spaced apart from the electronic display by an air gap.

In embodiments where conveying the image light comprises propagating the image light in sequence through a first plano-convex lens, through a stack of a second quarter-wave waveplate and a reflective polarizer, and through a second plano-convex lens, the method may further include disposing the quarter-wave waveplate closer to the pancake lens than to the electronic display. In embodiments where conveying the image light comprises propagating the image light in sequence through a first plano-convex lens, through a second plano-convex lens having a convex side facing towards the circular polarizer, and through a polarization-selective reflector, the method may further include disposing the quarter-wave waveplate within 25% of the middle between the electronic display and the pancake lens.

Referring to FIG. 1, a near-eye display assembly 100 of the present disclosure includes an electronic display 102 for providing image light 110, a circular polarizer 104 disposed downstream of the electronic display 102 for circularly polarizing the image light 110, and a pancake lens 106 disposed downstream of the circular polarizer 104 for conveying the image light 110 to an eyebox 108. Herein and throughout the rest of the specification, the term "downstream" means in the direction of propagation of the image light 110, that is, generally in a direction away from the electronic display 102 and towards the eyebox 108.

The circular polarizer 104 may include a first quarter-wave waveplate 111 disposed between the electronic display 102 and the pancake lens 106. The first quarter-wave waveplate 111 is spaced apart from both the electronic display 102 and the pancake lens 106. The circular polarizer 104 may further include an air-facing linear polarizer 114 upstream of, and in contact with, the first quarter-wave waveplate 111, and an air-facing anti-reflective (AR) coating 116 on the first quarter-wave waveplate 111, facing the downstream direction. Herein, the term "in contact" means lacking an air gap or another sharp refractive index step at a boundary, such that Fresnel reflections of light from the area of contact are negligible. For example, the first quarter-wave waveplate 111 is in contact with the linear polarizer 114 and with its AR coating 116 (while being separated from the electronic display 102 and the pancake lens 106 by air gaps).

In the embodiment shown in FIG. 1, the pancake lens 106 includes a first plano-convex lens 121 having a partial (typically 50%) reflector 124 coated on its convex side facing the circular polarizer 104. About 50%, e.g. 50%+− 10%, of light is transmitted through the partial reflector 124. A second quarter-wave waveplate 112 is in contact with a flat side of the first plano-convex lens 121. A reflective polarizer 126 is in contact with the second quarter-wave waveplate 112. The reflective polarizer 126 has a transmission axis at 45 degrees relative to an optic axis of the second quarter-wave waveplate 112. Together, the second quarter-wave waveplate 112 and the reflective polarizer 126 form a polarization-selective reflector 202. A second plano-convex lens 122 has a flat side in contact with the reflective polarizer 126. Thus, the pancake lens 106 includes a pair of plano-convex lenses 121,122 and a stack of the second quarter-wave waveplate 112 and the reflective polarizer 126 sandwiched between flat sides of the pair of plano-convex lenses 121,122. The first 121 and second 122 plano-convex lenses can be bonded together by the stack of the second quarter-wave waveplate 112 and the reflective polarizer 126, or they may be fixed separately from one another for alignment purposes.

In operation, the image light 110 propagates through the circular polarizer 104 and becomes circularly polarized. The image light 110 gets focused by refraction at the proximal convex surface of the first plano-convex lens 121, then reflects back towards the partial reflector 124, as shown with solid arrows. The partial reflector 124 acts as a concave mirror, additionally focusing the reflected image light 110 towards the second plano-convex lens 122. The distal convex side of the second plano-convex lens 122 (i.e. farthest from the electronic display 102) additionally focuses the image light 110 by refraction.

Figure 2:
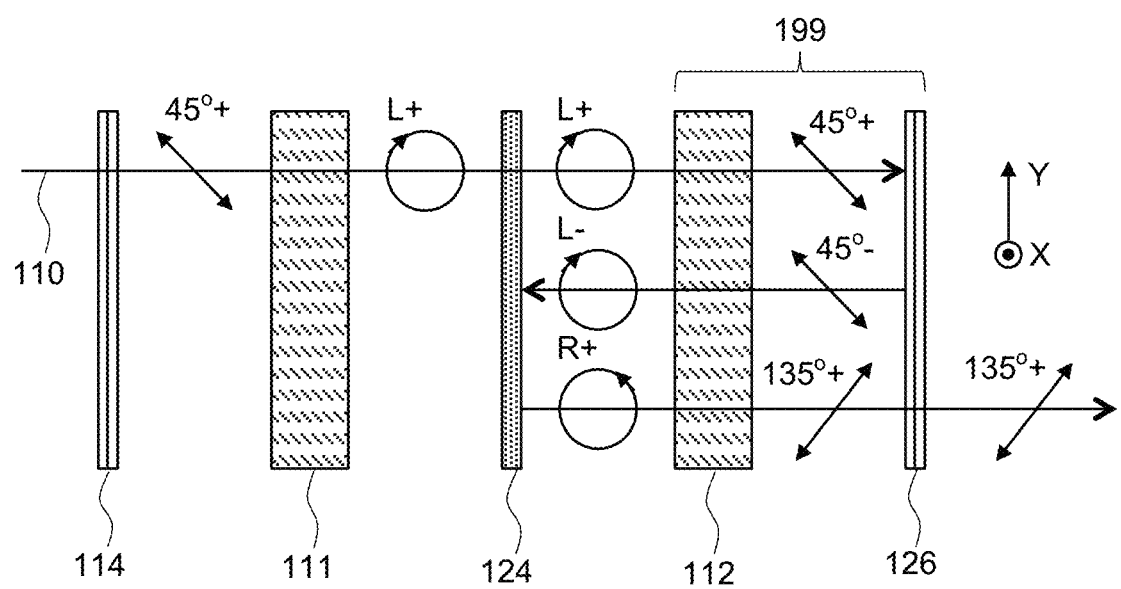
FIG. 2 is a polarization diagram of an optical beam propagating through the pancake lens of FIG. 1.

The folded optical path of the image light 110 is achieved by manipulating polarization of the image light 110 as the image light 110 propagates from the electronic display 102 to the eyebox 108. Referring to FIG. 2, the image light 110 propagates through the linear polarizer 114 with transmission axis oriented at 45 degrees from x-axis, which is perpendicular to plane of FIG. 2, and through the first quarter-wave waveplate 111. The optic axis of the first quarter-wave waveplate 111 is oriented at 45 degrees with respect to the polarization axis of the linear polarizer 114 (i.e. 90 degrees from X-axis, or parallel to Y-axis), such that the image light 110 is left-circularly polarized upon propagating through the first quarter-wave waveplate 111, as indicated by "L+". Herein, the sign "+" relates to the direction of propagation, which is assumed to be positive in going from left to right, and negative ("−") in going from right to left in FIG. 1 and FIG. 2. The image light 110 then impinges on the partial reflector 124 (FIG. 2), and a portion of that light, 50% in this case, propagates through the first plano-convex lens 121, impinging on the second quarter-wave waveplate 112 oriented at 90 degrees with respect to the optic axis of the first quarter-wave waveplate 111 (i.e. along X-axis). This brings the polarization back to linear at 45 degrees from X-axis. Then, the image light 110 impinges onto the reflective polarizer 126 having a transmission axis oriented at 135 degrees and a reflection axis oriented at 45 degrees with respect to X-axis, and with respect to the optic axis of the second quarter-wave waveplate 112. The image light 110, being polarized at 45 degrees, is reflected by the reflective polarizer 126 to propagate in "−" direction; a small portion of that light, typically less than 1%, is transmitted due to misalignment and finite extinction ratio of the reflective polarizer 126, however it is strongly out of focus and as such is usually not of a significant concern. The polarization of the reflected light 110 is linear at 45 degrees. The reflected image light 110 propagates back (i.e. right to left in FIG. 2) through the second quarter-wave waveplate 112, after which its polarization becomes L-circular polarization. Then, the reflected light propagates through the first plano-convex lens 121 (FIG. 1). The partial reflector 124 reflects a portion of the image light 110 to propagate towards the eyebox 108. That portion is right circular polarized (R+; FIG. 2), since handedness of a circular polarization changes upon reflection from a mirror. Upon propagating through the second quarter-wave waveplate 112, the image light 110 acquires a linear polarization at 135 degrees, which is then passed through by the reflective polarizer 126.

Other orientation of the polarization components depicted in FIG. 2 are possible. For example, in one embodiment, the linear polarizer 114 has a vertical transmission axis, i.e. parallel to the Y axis. In this embodiment, the optic axes of the first 111 and second 112 quarter-wave waveplates are at 45 degrees w.r.t. X- and Y-axes, and the reflection axis of the reflective polarizer 126 is also parallel to the Y-axis.

Figure 3A:
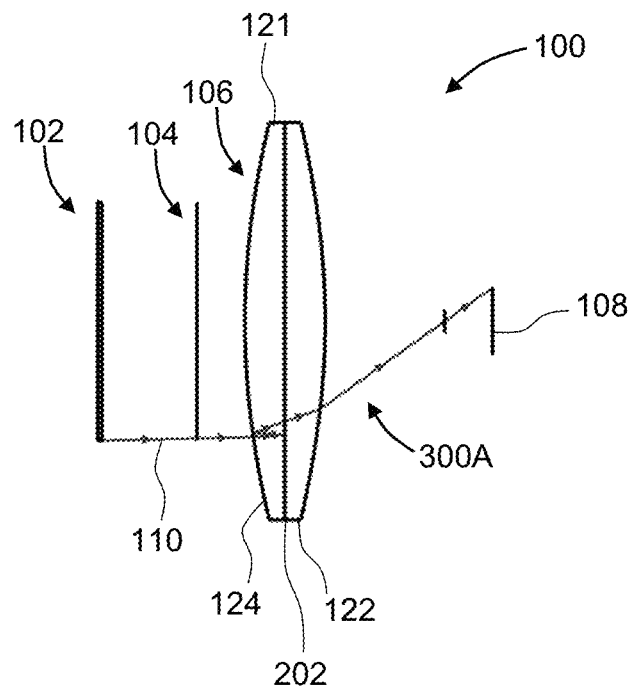
FIG. 3A is a signal path raytrace diagram for the near-eye display assembly of FIG. 1.

Ghost image formation in the near-eye display assembly 100 is illustrated in FIGS. 3A to 3D. Only ghosts with a comparatively small defocus will be considered. Referring initially to FIG. 3A, a main signal path 300A, that is, a path of the image light 110 forming a main image at the eyebox 108, is illustrated as a baseline. Briefly, the image light 110 propagates through the circular polarizer 104 from left to right in FIG. 3A, propagates through the first plano-convex lens 121, reflects from the polarization-selective reflector 202 to propagate from right to left, and then reflects from the partial reflector 124 to propagate from left to right again. The image light 110 is then transmitted through both first 121 and second 122 plano-convex lenses and propagates to the eyebox 108 for observation by a viewer.

Figure 3B:
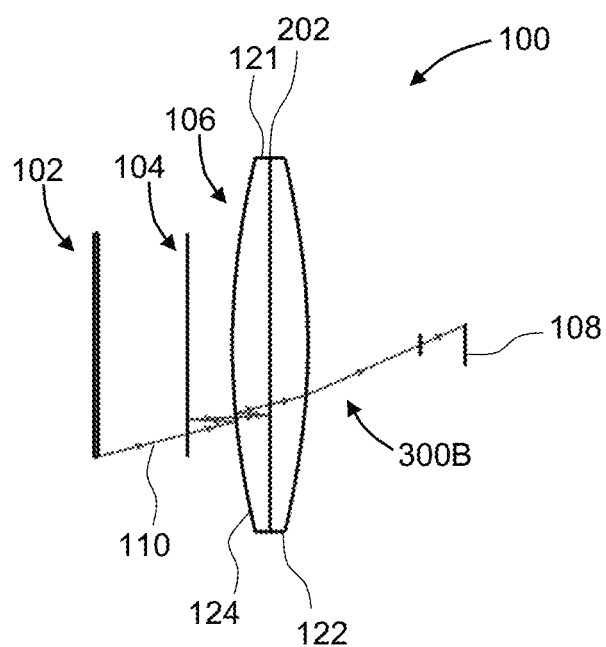
FIGS. 3B, 3C, and 3D are ghost paths raytrace diagrams for the near-eye display assembly of FIG. 1.

Turning to FIG. 3B, a first ghost path 300B is illustrated. The image light 110 propagates through the circular polarizer 104 from left to right in FIG. 3B, but instead of being transmitted through the partial reflector 124 on the first pass, reflects from the partial reflector 124 back towards the circular polarizer 104, and then reflects from the circular polarizer 104 to propagate from left to right towards the pancake lens 106. More specifically, the image light 110 reflects from the AR coating 116 on the first quarter-wave waveplate 111 shown in FIG. 1. From then on, the image light 110 propagates similarly to the main signal path 300A due to the similar polarization state, i.e. the image light 110 reflects (FIG. 3B) from the polarization-selective reflector 202 to propagate from right to left, and then reflects from the partial reflector 124 to propagate from left to right again. The image light 110 is transmitted through both first 121 and second 122 plano-convex lenses. Then, the image light 110 propagates to the eyebox 108, forming a first ghost image. The power level of the first ghost image relative to the main signal image is 0.5*AR, where the coefficient 0.5 is due to an extra reflection from the partial reflector 124 (50% in this example), and wherein AR is a reflection coefficient of the AR coating 116 on the first quarter-wave waveplate 111.

Figure 3C:
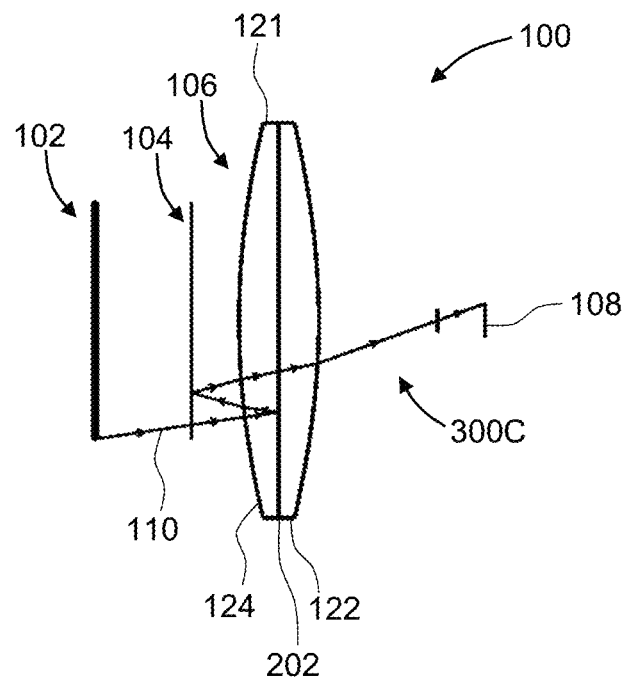

Referring now to FIG. 3C, a second ghost path 300C is illustrated. The image light 110 propagates through the circular polarizer 104 from left to right in FIG. 3C, propagates through the first plano-convex lens 121, and reflects from the polarization-selective reflector 202 to propagate from right to left. So far, the second ghost path 300C is same as the main signal path 300A. However, instead of reflecting from the partial reflector 124, the image light 110 of the second ghost path 300C propagates through the partial reflector 124 and is reflected from the circular polarizer 104 instead (i.e. from the AR coating 116 on the first quarter-wave waveplate 111; FIG. 1), to propagate from left to right towards the pancake lens 106. Then, the image light 110 propagates (FIG. 3C) through the partial reflector 124, through the first plano-convex lens 121, through the polarization-selective reflector 202, through the second plano-convex lens 122, and to the eyebox 108. The power level of the second ghost image relative to the main signal image is also 0.5*AR, where the coefficient 0.5 is due to an extra transmission from the partial reflector 124 (50% in this example).

Figure 3D:
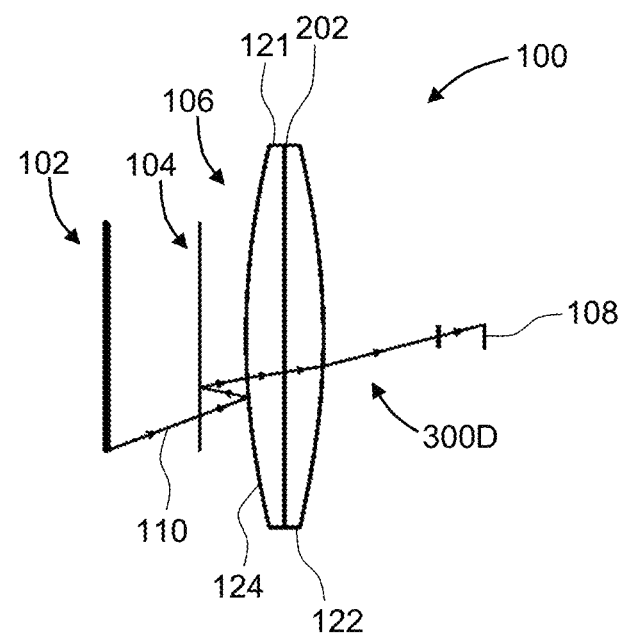

Turning to FIG. 3D, a third ghost path 300D is illustrated. The image light 110 propagates through the circular polarizer 104 from left to right in FIG. 3D, but instead of being transmitted through the partial reflector 124 on the first pass, reflects from the partial reflector 124 back towards the circular polarizer 104, and then reflects from the circular polarizer 104 (i.e. from the AR coating 116 on the first quarter-wave waveplate 111) to propagate from left to right towards the pancake lens 106. Then, although the polarization of the image light 110 is suitable for reflection from the polarization-selective reflector 202, a small portion of the image light 110 leaks through the polarization-selective reflector 202 to propagate through the second plano-convex lens 122 and further to the eyebox 108. The power level of the third ghost image relative to the main signal image is ER*AR, where ER is power extinction ratio of the polarization-selective reflector 202. Typically, ER is of the order of 0.01. It is noted that all three ghost images are formed due to reflection from the AR coating 116 of the first quarter-wave waveplate 111 of the circular polarizer 104.

Figure 4A:
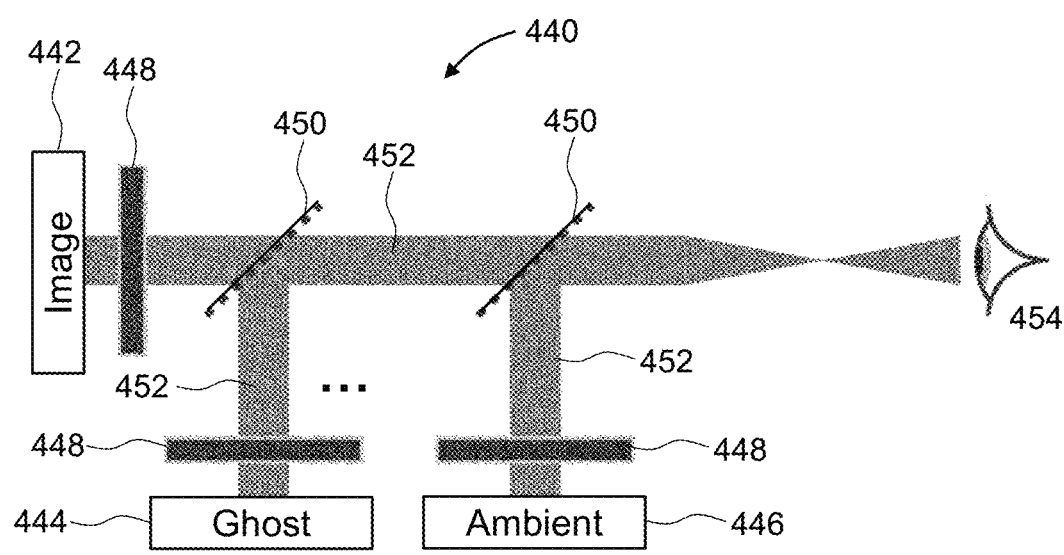
FIG. 4A is a top schematic view of a test apparatus for evaluating an impact of brightness and defocus of ghost artifacts on a perceived image quality.

In accordance with the present disclosure, structural parameters of a pancake lens assembly may be varied to defocus, attenuate, rescale, or shift ghost images to lessen the impact of the ghost images on the main image as perceived by a viewer. A user study has been performed to evaluate a degree of defocus of ghost images required to make a perceived quality of the main image acceptable to the viewer. FIG. 4A illustrates a test apparatus 440 used to evaluate the impact of ghost image defocus on perceived image quality. The test apparatus 440 includes a main image generating unit 442, at least one ghost image generating unit 444, and an ambient illumination generating unit 446. Typically, multiple ghost image generating units 444 are provided (only one is shown for brevity) to generate multiple ghost images, for example ghost images corresponding to the first 300B to third 300D ghost image paths shown in FIGS. 3B to 3D, respectively.

The main image generating unit 442, the ghost image generating unit 444, and the ambient illumination generating unit 446 can provide respective images at a various degree of brightness or power density and contrast. Focus-tuneable lenses 448 are provided to independently defocus the respective images. Beamsplitters 450 couple optical beams 452 generated by the units 442, 444, 446 into a combined beam, and direct the combined beam towards an observer's eye 454. The test apparatus 440 enables independent brightness and focus adjustment of the main image, ghost image(s), and the background brightness and texture, for evaluation of perceived resulting image quality by human observer(s).

Figure 4B:
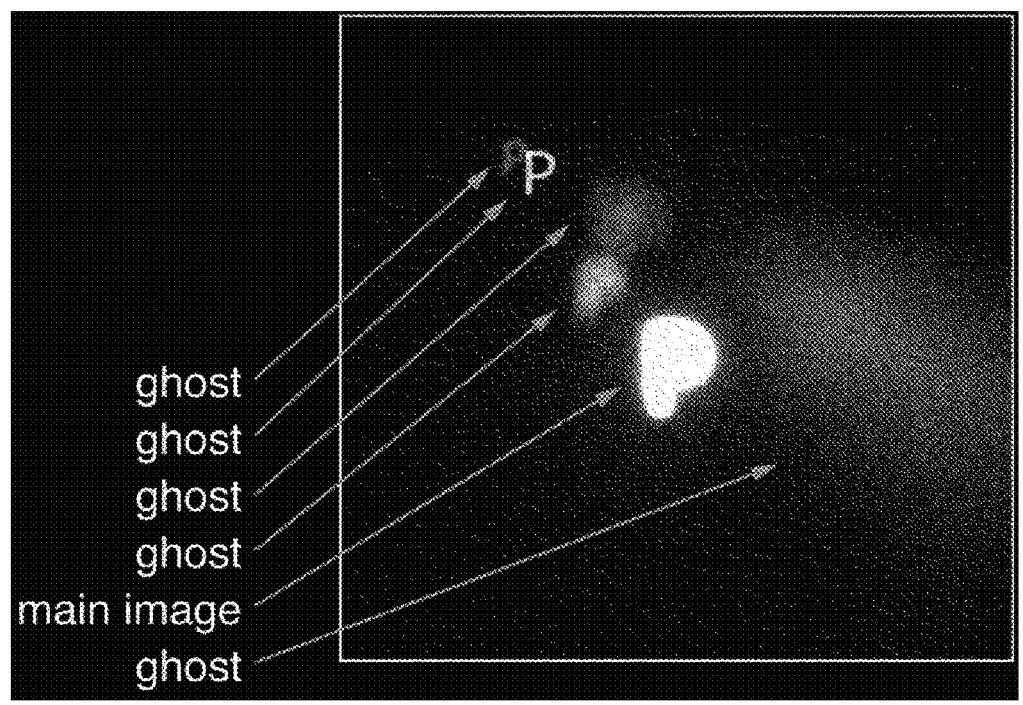
FIG. 4B is an example image provided by the test apparatus of FIG. 4A, the image showing an overexposed main image of letter "P" and various ghost images.

FIG. 4B shows a typical view at the output of the test apparatus 440 as observed by the eye 454. The main image of letter "P", used as an example, is overexposed to bring up various ghost images superimposed with the main image. Some ghost images may be sufficiently defocused such that the letter "P" is no longer recognizable; and some may actually stay in focus. It has been determined that the acceptable degree of defocus may depend on type of the main image being displayed e.g. pictures or text, the spatial frequency spectrum of the main image, the contrast of the main image, etc. As a non-limiting example, the required degree of negative defocus (underfocus) of ghost images can be larger in magnitude than 5-7 Diopters. The required degree of positive defocus (overfocus) can be greater than approximately 6-8 Diopters.

Figure 4C:
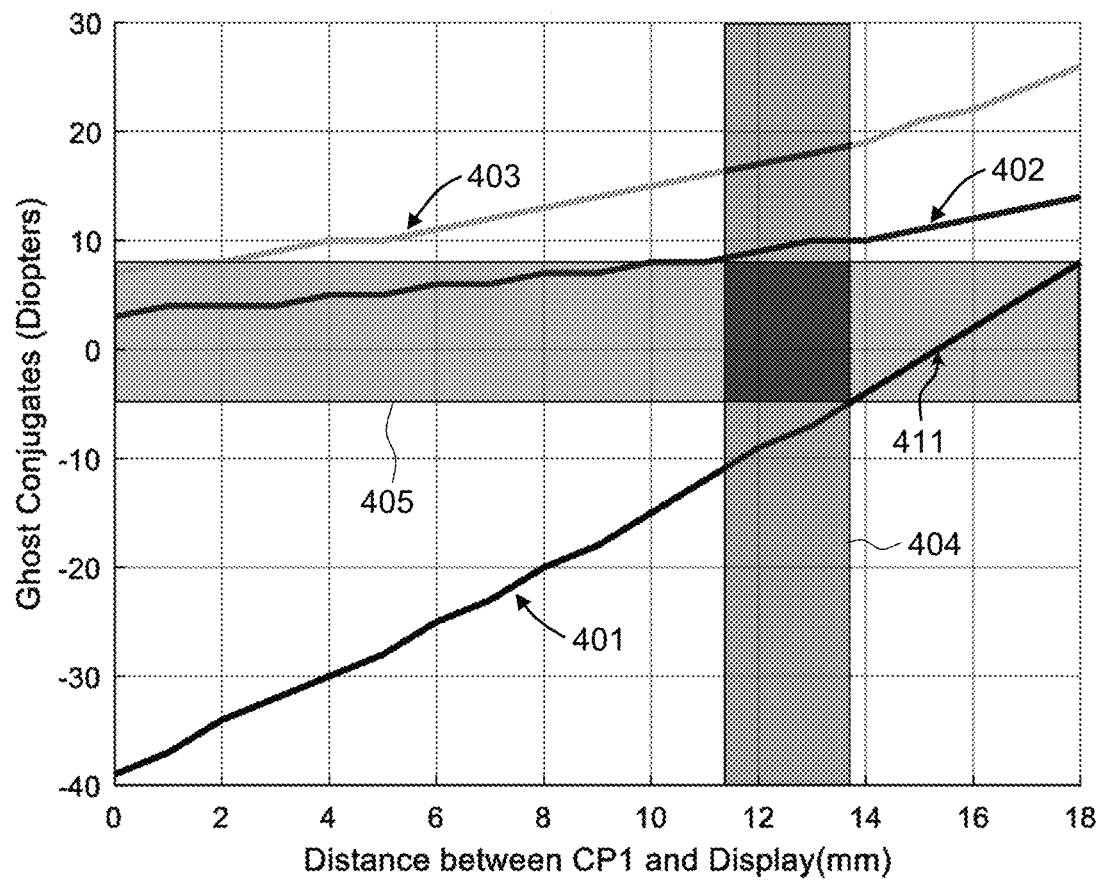
FIG. 4C is a plot of ghost defocusing vs. distance between a circular polarizer and the electronic display of the near-eye display assembly of FIG. 1.

Referring to FIG. 4C, defocusing of the first, second, and third ghost images corresponding to the first 300B, second 300C, and third 300D ghost image paths shown in FIGS. 3B to 3D, respectively, is plotted as a function of the distance between the circular polarizer (CP1) 104, or more specifically the AR coating 116, and the electronic display 102 of the near-eye display assembly 100 of FIG. 1. A first ghost image defocusing curve 401 begins at approximately −40 Diopter at zero distance, which corresponds to a case when the circular polarizer 104 is bonded directly to the electronic display 102. At zero distance, the image light 110 travels the maximum distance after first reflection from the partial reflector 124, which has negative focusing power for external reflections, which ensures a large defocus. As the distance is increased, the defocus of first ghost image is reduced, and at some distance, as indicated at 411, the first ghost image may actually be in-focus with the main image.

A second ghost image defocusing curve 402 begins at approximately +3 Diopter. The degree of over-focus gradually increases with the distance, reaching about +14 Diopter at maximum distance, corresponding to the circular polarizer contacting the partial reflector 124, e.g. bonded directly to the partial reflector 124. A third ghost image defocusing curve 403 begins at approximately +7 Diopter. The degree of over-focus gradually also increases with the distance, reaching about 27 Diopter at the maximum distance.

In accordance with the present disclosure, the distance between the AR coating 116 and the electronic display 102 may be selected such that all three ghost images can be moved out of focus enough to become acceptable to viewers of the main image, e.g. as evaluated using the apparatus 440 of FIG. 4A. This acceptable defocus level may be different for positive and negative defocus. By way of a non-limiting example, when the distance is within an acceptance zone 404, the negative defocus of the first ghost image is below −5 Diopters, i.e. negative and larger in magnitude than 5 Diopters, while defocus of the second and third ghost images is above +8 Diopters, that is, positive and larger in magnitude than 8 Diopters. At smaller distances, the first 401 and second 402 ghost image defocusing curves are within a conspicuity zone 405, that is, a zone where the ghost artifacts are noticeable. At larger distances, the first ghost image defocusing curve 401 is within the conspicuity zone 405. It is noted that stated defocus levels are only examples. Other threshold levels may be established depending on the type of a near-eye display, the type of imagery being displayed (i.e. a landscape image, a face image, a text, etc.), image brightness, contrast, spatial frequency spectrum, etc. For the pancake lens configuration shown in FIG. 1, the optimum distance tends to be more than half of the total distance between the electronic display 102 and the pancake lens 106. In other words, the first quarter-wave waveplate 111 may be disposed closer to the pancake lens 106 than to the electronic display 102 when in optimal position. When all substantial ghost images, i.e. images having a noticeable brightness level, are defocused beyond some threshold, the ghost artifacts may become inconspicuous or non-distracting to the viewer.

Table 1 below summarizes the defocus and power level of all three ghost images considered above.

TABLE 1

| Signal/Ghost/Optical Paths | | Power Level at Eyebox | Focus/Conjugate | |
|---|---|---|---|---|
| | | | Non-optimized | Optimized |
| Signal, Path 300A | 102-104-124-112-126-112-124-112-126-108 | 1 | — | |
| Ghost 1, Path 300B | 102-104-124-116-124-112-126-112-124-112-126-108 | 0.5AR | −40D | −7D |
| Ghost 2, Path 300C | 102-104-124-112-126-112-124-116-124-112-126-108 | 0.5AR | +3D | +10D |
| Ghost 3, Path 300D | 102-104-124-116-124-112-126-108 | ER*AR | +7D | +17D |

The first column of Table 1 denotes the optical path. Each one of the main signal path 300A (FIG. 3A); first ghost path 300B (FIG. 3B); second ghost path 300C (FIG. 3C); and third ghost path 300D (FIG. 3D) is denoted in the second column with a sequence of reference numerals of corresponding optical elements in the optical path from the electronic display 102 to the eyebox 108. The third column of Table 1 shows power levels representing brightness or total optical power of a corresponding image, relative to main image brightness or total optical power. Thus, the main image brightness is equal to 1 by definition. The brightness of Ghosts 1 and 2 is 0.5AR, where AR is the reflectivity of the AR coating 116. The brightness of Ghosts 1 and 2 may therefore be reduced by further reducing the reflectivity of AR coating. There are some limits to which the AR coating reflectivity may be reduced, especially over the entire visible wavelength range. The brightness of Ghost 3 is ER times AR, where ER is the extinction ratio of the reflective polarizer 126. Ghost 3 can be reduced by optimizing the AR coating 116, the reflective polarizer 126, or both. Brightness of Ghost 3 is usually lower than brightness of Ghosts 1 and 2.

The forth column of Table 1 shows a "non-optimized" defocusing, that is, the defocusing of ghost images relative to the focus position of the main image in Diopters for a case when the first half-wave waveplate 111 is laminated onto the electronic display 102. It is noted that the focus can be a real focus or a conjugate focus, i.e. an imaginary focal position of diverging rays if traced back until intersection. The focusing of the main signal path is zero Diopters by definition. The non-optimized focusing of the first ghost image is approximately −40 Diopters, i.e. the first ghost image is strongly under-focused. The non-optimized focusing of the second ghost image is approximately +3 Diopters, i.e. the second ghost image is slightly over-focused. The non-optimized focusing of the third ghost image is approximately +7 Diopters, i.e. the second ghost image is reasonably over-focused.

The fifth column of Table 1 denotes "optimized" focusing, where the position of the circular polarizer 104 including the AR-coated first quarter-wave waveplate 111 has been optimized to balance the defocusing of different ghost paths, i.e. in the middle of the acceptance zone 404. The focusing of the main signal path is at the optimized position of the circular polarizer 104 is zero Diopters for "optimized" position as well, because the position of the circular polarizer 104 does not impact the focusing power of the pancake lens 106. The optimized focusing of the first ghost image is approximately minus 7 Diopters, i.e. the first ghost image is sufficiently under-focused. The optimized focusing of the second ghost image is approximately +10 Diopters, i.e. the second ghost image is sufficiently over-focused. The optimized focusing of the third ghost image is approximately +17 Diopters, i.e. the second ghost image is strongly over-focused.

Figure 5:
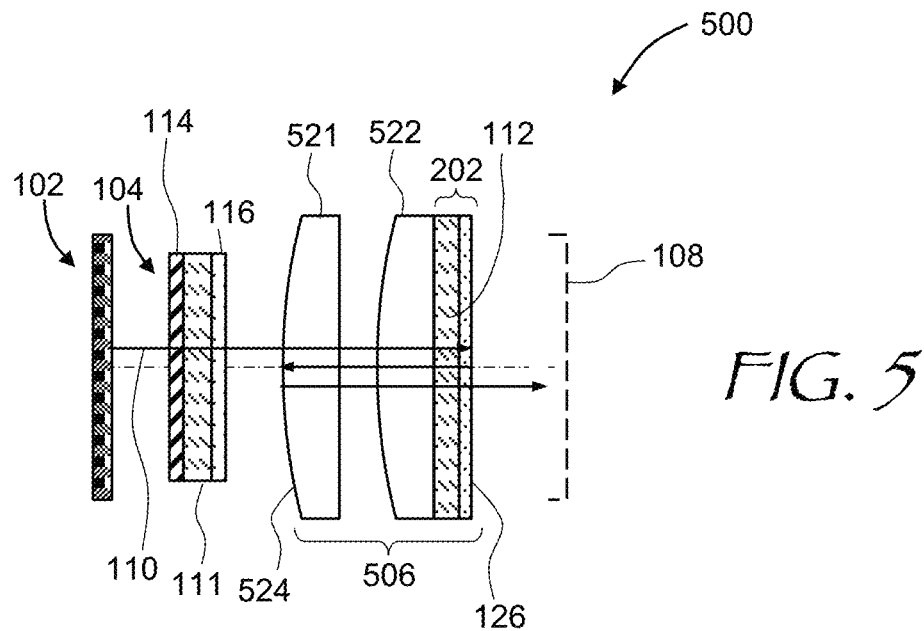
FIG. 5 is a side cross-sectional view of an example embodiment of a near-eye display assembly including a pancake lens.

Referring now to FIG. 5, a near-eye display assembly 500 of the present disclosure includes the electronic display 102 for providing the image light 110, the circular polarizer 104 disposed downstream of the electronic display 102 for circularly polarizing the image light 110, and a pancake lens 506 disposed downstream of the circular polarizer 104 for conveying the image light 110 to the eyebox 108. The pancake lens 506 includes first 521 and second 522 plano-convex lenses facing in a direction of the electronic display 102, the second quarter-wave waveplate 112, and the reflective polarizer 126 disposed downstream of the first 521 and second 522 plano-convex lenses. The convex surface of the first plano-convex lens 521 facing the circular polarizer 104 is coated with a partial reflector 524, e.g. having approximately 50% reflection and 50% transmission. The second quarter-wave waveplate 112 is in contact with a flat side of the second plano-convex lens 522. The reflective polarizer 126 is in contact with the second quarter-wave waveplate 112. The reflective polarizer 126 has a transmission axis at 45 degrees relative to an optic axis of the second quarter-wave waveplate 112. Together, the second quarter-wave waveplate 112 and the reflective polarizer 126 form the polarization-selective reflector 202. In some embodiments, the second quarter-wave waveplate 112 may be in contact with the first plano-convex lens 521, and the reflective polarizer 126 may be in contact with the second plano-convex lens 522.

The operation of the near-eye display assembly 500 of FIG. 5 is similar to the operation of the near-eye display assembly 100 of FIG. 1, in that the folded beam path for the pancake lens 506 is established using the polarization transformation illustrated in FIG. 2. Briefly, the image light 110 propagates through the circular polarizer 104 and becomes circularly polarized. The image light 110 is then refracted (focused) by the proximal convex sides of the first 521 and second 522 plano-convex lenses, then reflects back towards the partial reflector 524 as shown with solid arrows. On the way back, the image light 110 is additionally focused by the convex surface of the second plano-convex lens 522. The partial reflector 524 acts as a concave mirror, further focusing the image light 110 reflected towards the second plano-convex lens 122. The proximal convex surface of the second plano-convex lens 522 (i.e. closest from the electronic display 102) additionally focuses the image light 110 by refraction. The near-eye display assembly 500 of FIG. 5 has similar ghost optical paths as the near-eye display assembly 100 of FIG. 1.

Figure 6:
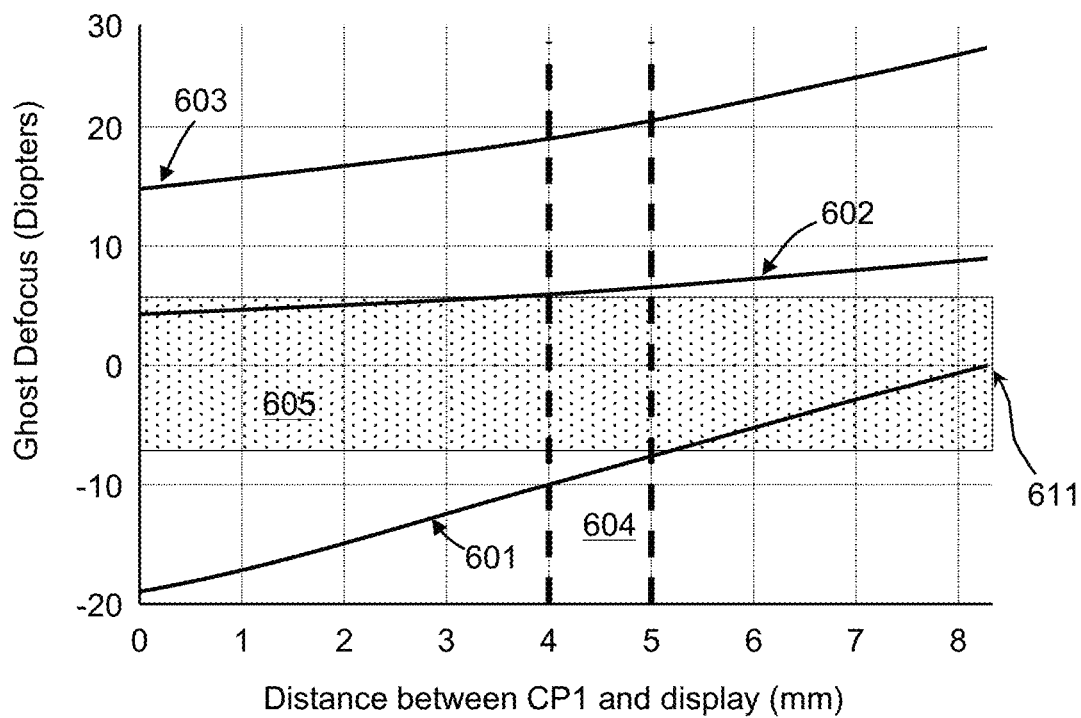
FIG. 6 is a plot of ghost defocusing vs. distance between a circular polarizer and the electronic of the near-eye display assembly of FIG. 5.

The ghost performance of the near-eye display assembly 500 of FIG. 5 is illustrated in FIG. 6, which shows defocusing of the first, second, and third ghost images as a function of the distance between the circular polarizer (CP1) 104, or more specifically the AR coating 116, and the electronic display 102 of the near-eye display assembly 500 of FIG. 5. A first ghost image defocusing curve 601 begins at approximately −19 Diopter at zero distance, which corresponds to a case when the circular polarizer 104 is formed directly on the electronic display 102. At zero distance, the image light 110 travels the maximum distance after first reflection from the partial reflector 124, which has negative (defocusing) power for external reflections, which ensures a maximum defocus. As the distance is increased, the defocus of first ghost image is reduced, and at some distance, as indicated at 611, the first ghost image may actually be in-focus with the main image.

A second ghost image defocusing curve 602 begins at approximately +4 Diopter. The degree of over-focus gradually increases with the distance, reaching about +9 Diopter at maximum distance, corresponding to the circular polarizer touching the partial reflector 124 at the center, or being placed directly on the partial reflector 124 of the first plano-convex lens 521. A third ghost image defocusing curve 603 begins at approximately +14 Diopter. The degree of over-focus gradually also increases with the distance, reaching about 26 Diopter at the maximum distance.

For the pancake lens configuration of FIG. 5, the distance between the AR coating 116 and the electronic display 102 may also be selected such that all three ghost images are defocused at least by some minimum amount, such that they are less conspicuous to the viewer of the image conveyed by the pancake lens 506. This minimum defocus level may be different for positive and negative defocus. By way of a non-limiting example, when the distance is within an acceptance zone 604, the negative defocus of the first ghost image is below −10 Diopters, i.e. negative and larger in magnitude than 10 Diopters, while defocus of the second and third ghost images is above +6 Diopters, that is, positive and larger in magnitude than 6 Diopters. At smaller distances, the second ghost image defocusing curve 602 is within a conspicuity zone 605, and at larger distances, the first ghost image defocusing curve 601 is within the conspicuity zone 605. Other threshold levels may be established depending on a type of a near-eye display, a type of image being displayed, etc. For the pancake lens configuration of FIG. 5, the optimum distance tends to be approximately in the middle of the total distance between the electronic display 102 and the pancake lens 106. In other words, the first quarter-wave waveplate 111 may be disposed approximately in the middle, e.g. within 10%-25% of the middle point, between the electronic display 102 and the pancake lens 506. When all ghost images having a noticeable brightness level are defocused beyond some threshold, the ghost images may become inconspicuous/non-distracting to the viewer.

Figure 7:
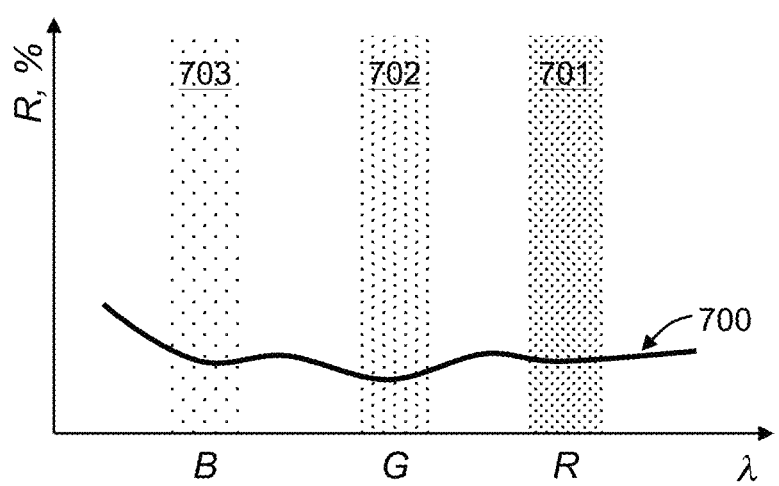
FIG. 7 is a spectral plot of anti-reflective (AR) coating reflectivity of a quarter-wave waveplate of the near-eye display assemblies of FIGS. 1 and 5, according to an embodiment.

To make ghost images less noticeable, their defocusing may be increased, and/or their power level may be decreased by selecting proper coatings and polarizers with high extinction ratios. Yet another option to reduce the impact of ghost images in pancake lens assemblies is to optimize AR coatings to ensure that ghost images are discolored, i.e. lack bright color hues. Referring to FIG. 7, a reflectivity curve 700 denotes spectral reflectivity of an AR coating, for example the AR coating 116 of the first quarter-wave waveplate 111 of FIGS. 1 and 5. Bars 701, 702, and 703 denote red (R), green (G), and blue (B) color channels, respectively. In accordance with an aspect of the disclosure, the reflectivities at wavelengths of red, green, and blue color channels can be made similar in magnitude, to avoid coloring of the ghost images. In some embodiments, the reflectivities differ by less than 50% of the reflectivity at the wavelength of the green color channel. This can make the first, second, and third ghost images less colored, at least in comparison with the main image, and consequently less distinct from the main image and/or less noticeable to the viewer. The AR coating 116 of the first quarter-wave waveplate 111 is important because all three ghost paths include a reflection from the AR coating 116 (Table 1, 2$^{nd}$ column).

Figure 8A:
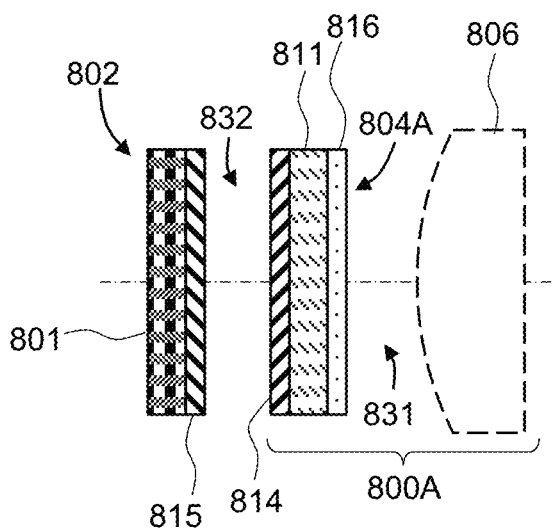
FIG. 8A is a side cross-sectional view of a circular polarizer separated from the electronic display by an air gap, for use in the near-eye display assemblies of FIGS. 1 and 5.

Various embodiments of a polarization stack of the present disclosure will now be described. Referring to FIG. 8A, an optical assembly 800A is configured for conveying image light emitted by an electronic display 802 to form an image in angular domain at a display's eyebox, not shown. The optical assembly 800A includes a polarization stack 804A and a pancake lens subassembly 806 separated from the polarization stack 804A by a first air gap 831. The polarization stack 804A includes the following elements in the direction of light propagation (from left to right): an air-facing first linear polarizer 814 separated from the electronic display 802 by a second air gap 832, a quarter-wave waveplate 811 in contact with the first linear polarizer 814, and an air-facing AR coating 816 on a surface of the quarter-wave waveplate 811 facing the pancake lens subassembly 806. A transmission axis of the first linear polarizer 814 is disposed at 45 degrees w.r.t. an optic axis of the quarter-wave waveplate 811. This is similar to the circular polarizer 104 of the near-eye display assembly 100 of FIG. 1 and the near-eye display assembly 500 of FIG. 5. The polarization stack 804A, including the quarter-wave waveplate 811, is separated from the pancake lens subassembly 806 and the electronic display 802 by the first 831 and second 832 air gaps, respectively.

In the embodiment shown, the electronic display 802 includes a liquid crystal array 801 coupled to a second linear polarizer 815. A transmission axis of the second linear polarizer 815 has a pre-defined orientation relative to the liquid crystal array 801. This is required for proper functioning of the electronic display 802, which is often manufactured as a unit, with the second linear polarizer 815 laminated onto the liquid crystal array 801. The transmission axis of the second linear polarizer 815 is approximately parallel to the transmission axis of the first linear polarizer 814. Thus, the second linear polarizer 815 transmits the linear polarization at substantially same orientation as the first linear polarizer 814. The two polarizers 814 and 815 may conveniently decouple the alignment of the electronic display 802 from the alignment of polarization components of the pancake lens. Furthermore, the first linear polarizer 814 blocks light at the orthogonal polarization propagating towards the electronic display 802, thus making sure the light does not reflect from the surface of the second linear polarizer 815, which would otherwise create same ghost images one tried to avoid in the first place by spacing the polarization stack 804A from the electronic display 802.

Figure 8B:
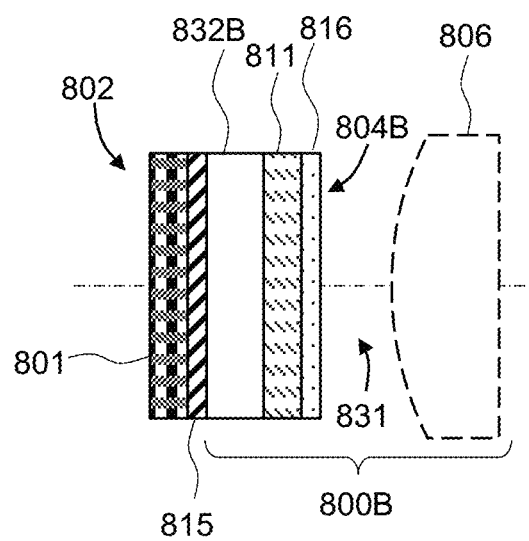
FIG. 8B is a side cross-sectional view of a circular polarizer coupled to a display by a glass spacer, for use in the near-eye display assemblies of FIGS. 1 and 5.

In some embodiments, the first linear polarizer 814 can be omitted. Referring to FIG. 8B, one of linear polarizers is replaced with a spacer 832B made of a transparent material such as glass or plastic. The purpose of the spacer 832B of an optical assembly 800B is to index-match the quarter-wave waveplate 811 to the second linear polarizer 815 and thus suppress undesired reflections giving rise to ghost artifacts.

Figure 8C:
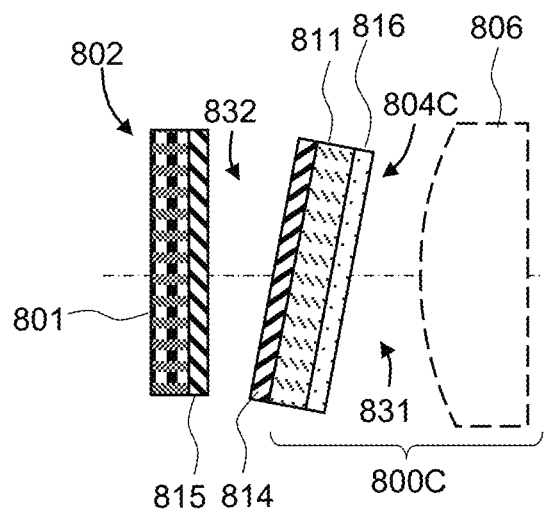
FIG. 8C is a side cross-sectional view of a tilted circular polarizer separated from the electronic display by an air gap, for use in the near-eye display assemblies of FIGS. 1 and 5.

Referring to FIG. 8C, an optical assembly 800C is similar to the optical assembly 800A of FIG. 8A. The optical assembly 800C of FIG. 8C includes a polarization stack 804C and the pancake lens subassembly 806 separated from the polarization stack 804C by the first air gap 831. The polarization stack 804C of the optical assembly 800C can have the same layers as the polarization stack 804A of the optical assembly 800A, i.e. it can include the air-facing first linear polarizer 814 separated from the electronic display 802 by the second air gap 832, the quarter-wave waveplate 811 in contact with the first linear polarizer 814, and the air-facing AR coating 816 on a surface of the quarter-wave waveplate 811 facing the pancake lens subassembly 806. The polarization stack 804C of the optical assembly 800C is tilted with respect to an optical axis 862 of the pancake lens 860. In other words, the polarization stack 804C forms an acute angle with the optical axis 862 of the pancake lens 860. This causes reflections from any of the layers of the polarization stack 804C, notably the AR coating 816, to propagate off-axis, shifting or completely removing ghost images associated with such reflections. Since the tilted polarization stack 804C has no optical power, i.e. focusing or defocusing power, the imaging properties of the optical assembly 800C are not affected. To offset shift of the main optical path caused by the tilted polarization stack 804C, the electronic display 802 may be shifted accordingly, e.g. upwards in FIG. 8C. Alternatively or in addition, the pancake lens may be shifted, e.g. downwards in FIG. 8C.

Figure 8D:
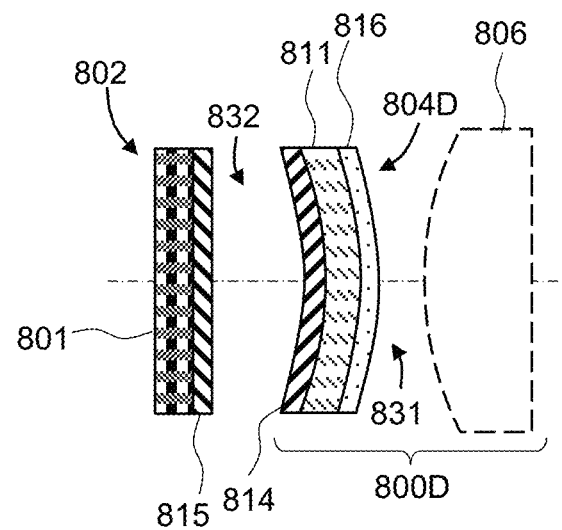
FIG. 8D is a side cross-sectional view of a curved circular polarizer separated from the electronic display by an air gap, for use in the near-eye display assemblies of FIGS. 1 and 5.

Turning to FIG. 8D, an optical assembly 800D is similar to the optical assembly 800A of FIG. 8A. The optical assembly 800D of FIG. 8D includes a polarization stack 804D and the pancake lens subassembly 806 separated from the polarization stack 804D by the first air gap 831. The polarization stack 804D of the optical assembly 800D can have the same layers as the polarization stack 804A of the optical assembly 800A, i.e. it can include the air-facing first linear polarizer 814 separated from the electronic display 802 by the second air gap 832, the quarter-wave waveplate 811 in contact with the first linear polarizer 814, and the air-facing AR coating 816 on a surface of the quarter-wave waveplate 811 facing the pancake lens subassembly 806. The polarization stack 804D of the optical assembly 800D is not flat, i.e. its outer optical surfaces are curved. This causes reflections from any of the layers of the polarization stack 804D, notably the AR coating 816, to additionally defocus ghost images associated with such reflections. Furthermore, the degree of defocus may be selected to shift the optimal distance between the electronic display 802 and the polarization stack 804D (providing sufficient defocus of main ghost images) to a desired distance, depending on a required NED configuration. When the radius of curvature is small enough, all ghost images may be defocused within a broad range of distances.

The curved polarization stack 804D can have any non-flat shape for as long as it has a substantially zero optical power, i.e. focusing or defocusing power, for transmitted light. By way of non-limiting examples, the polarization stack 804D may have cylindrical shape, toroidal shape, aspherical shape, etc. The outer surfaces of the polarization stack 804D may have identical surface shape to keep the optical power of the polarization stack 804D substantially zero for transmitted light. Herein, the term "substantially zero optical power" means much less than the optical power of the pancake lens 806, e.g. less than 5%, 3%, or 1% of the optical power of the pancake lens 806. In the embodiment shown, the curved polarization stack 804D has a shape of a meniscus with equal radiae of curvature of outer opposed optical surfaces. The equal radiae of curvature result in a substantially zero optical power. Since the curved polarization stack 804D has substantially zero optical power, i.e. focusing or defocusing power, the imaging properties of the optical assembly 800D are not affected, or affected insignificantly. The curved polarization stack 804D may also be tilted, similarly to the polarization stack 804C FIG. 8C.

The pancake lens subassembly 806 of optical assemblies 800A-800D may be constructed similarly to the pancake lens 106 of FIG. 1 or the pancake lens 506 of FIG. 5. The pancake lens subassembly 806 may include a plano-convex lens having a partial (e.g. 50%+−10%) reflective coating on its convex side facing the polarization stacks 804A, 804B, similarly to the partial reflector 124 on the first plano-convex lens 121 of the pancake lens 106 of FIG. 1, or the partial reflector 524 on the first plano-convex lens 521 of the pancake lens 506 of FIG. 5. The pancake lens subassembly 806 may further include a second quarter-wave waveplate in contact with a flat side of the first plano-convex lens, a reflective polarizer having a transmission axis at 45 degrees w.r.t. an optic axis of the second quarter-wave waveplate, and a second plano-convex lens having a flat side in contact with the reflective polarizer, as in the pancake lens 106 of FIG. 1. In some embodiments, the pancake lens subassembly 806 may further include a second plano-convex lens having a convex side facing towards the polarization stack, a second quarter-wave waveplate, a reflective polarizer downstream of the second quarter-wave waveplate and in contact with a flat side of the second plano-convex lens, the reflective polarizer having a transmission axis at 45 degrees w.r.t. an optic axis of the second quarter-wave waveplate, as in the pancake lens 506 of FIG. 5.

Figure 9:
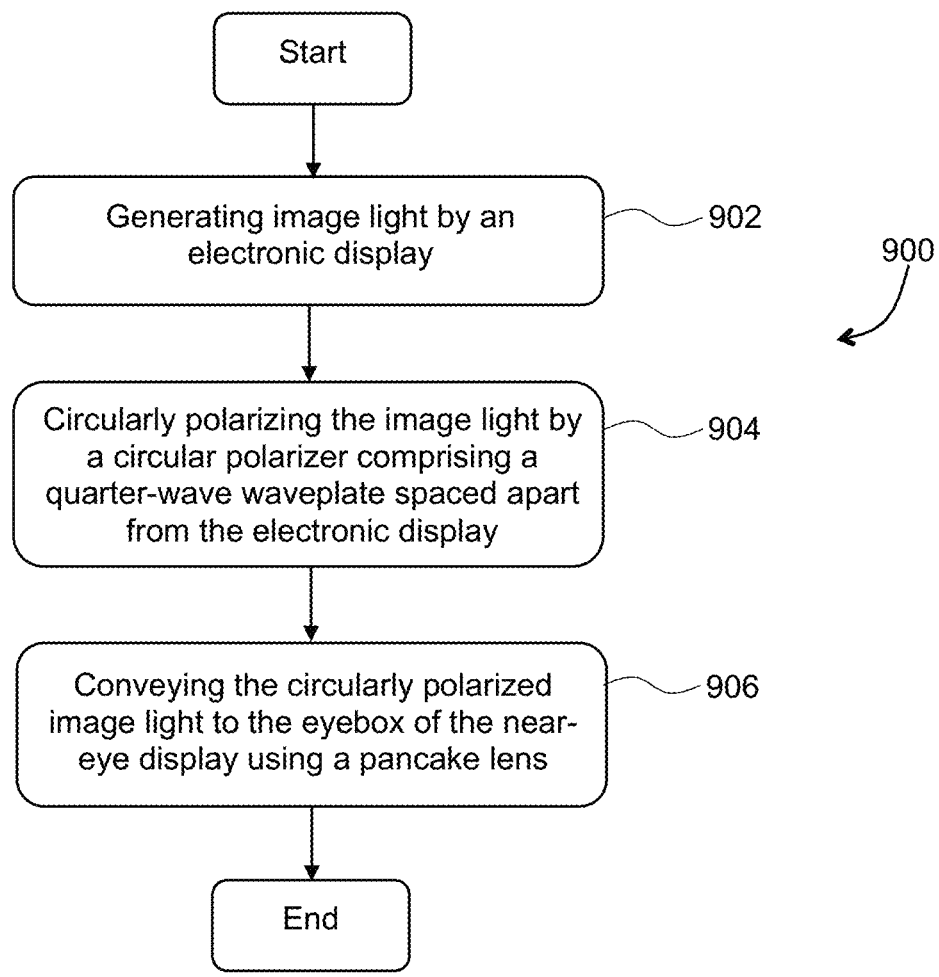
FIG. 9 is a flow chart of a method for coupling image light emitted by an electronic display to an eyebox of a near-eye display.

Referring to FIG. 9, a method 900 for providing image light to an eyebox of a near-eye display may include generating the image light (902) by a suitable electronic display e.g. a liquid crystal display (LCD) panel, a light-emitting diode array, a micro-electromechanical (MEMS) array display, etc. The image light is circularly polarized (904) by a circular polarizer comprising a quarter-wave waveplate spaced apart from the electronic display. By way of example, the image light 110 emitted by the electronic display 102 may be circularly polarized by the circular polarizer 104 (including the first quarter-way waveplate 111) spaced apart from the electronic display 102 by an air gap (FIGS. 1 and 5). By way of another example, the quarter-wave waveplate 811 may be spaced from the electronic display by the transparent spacer 832B (FIG. 8B), i.e. a glass spacer, a sapphire spacer, a crystalline spacer, a plastic spacer, etc. The quarter-wave waveplate 811 may be tilted as shown in FIG. 8C, curved as shown in FIG. 8D, or both tilted and curved in some embodiments. To circularly polarize the image light, the latter may be first linearly polarized by a linear polarizer and then propagated through the quarter-wave waveplate. The linear polarizer and the quarter-wave waveplate may form a polarization stack, which may be spaced from the electronic display and the pancake lens by an air gap (FIG. 8A), tilted (FIG. 8C), and/or curved (FIG. 8D).

The method 900 further includes conveying (906) the circularly polarized image light to the eyebox of the near-eye display using a pancake lens. The pancake lens is spaced by an air gap from the quarter-wave waveplate to lessen ghost image formation, as explained above. The quarter-wave waveplate is spaced apart from both the electronic display and the pancake lens.

Various types of pancake lenses can be used to convey the circularly polarized light to the eyebox of a NED. In some embodiments, the image light is propagated in sequence through a first plano-convex lens, through a stack of a second quarter-wave waveplate and a reflective polarizer, and through a second plano-convex lens, as in the near-eye display assembly 100 of FIG. 1. In some embodiments, the image light is propagated in sequence through a first plano-convex lens, through a second plano-convex lens having a convex side facing towards the polarization stack, and through a polarization-selective reflector, as in the near-eye display assembly 500 of FIG. 5. For both of these example pancake lens types, spacing the quarter-wave waveplate from the electronic display and the first surface of the pancake lens, by placing the quarter-wave waveplate in between the electronic display and the pancake lens, can result in increasing the overall defocusing of ghost images to make them less distracting to the user. For the first type of pancake lens shown in FIG. 1, the quarter-wave waveplate may be disposed closer to the pancake lens than to the electronic display. For the second type of pancake lens shown in FIG. 5, the quarter-wave waveplate may be disposed approximately in the middle, e.g. within 10%-25% of the middle between the electronic display and the pancake lens.

Figure 10A:
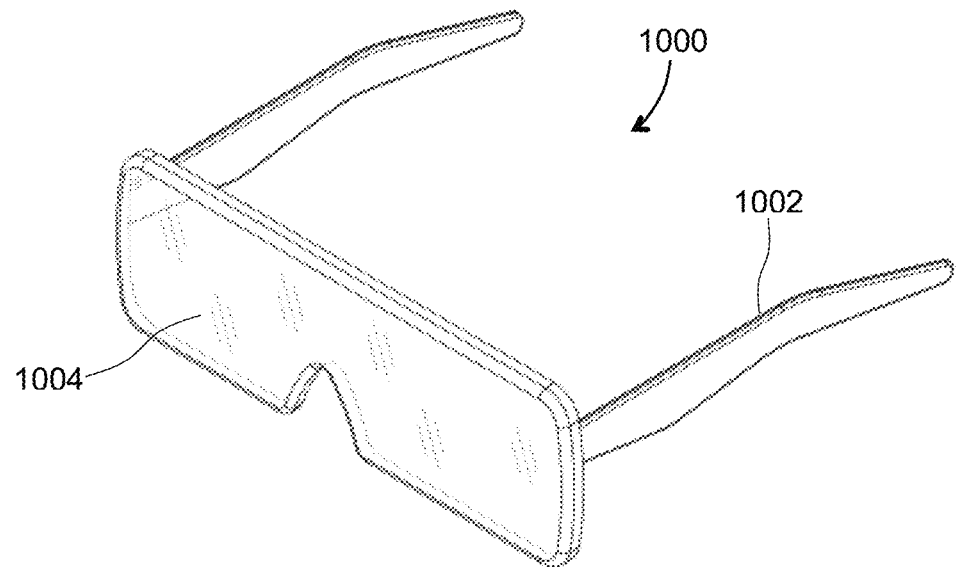
FIG. 10A is an isometric view of an eyeglasses form factor near-eye augmented reality (AR)/virtual reality (VR) display incorporating a near-eye display assembly of the present disclosure.
Figure 10B:
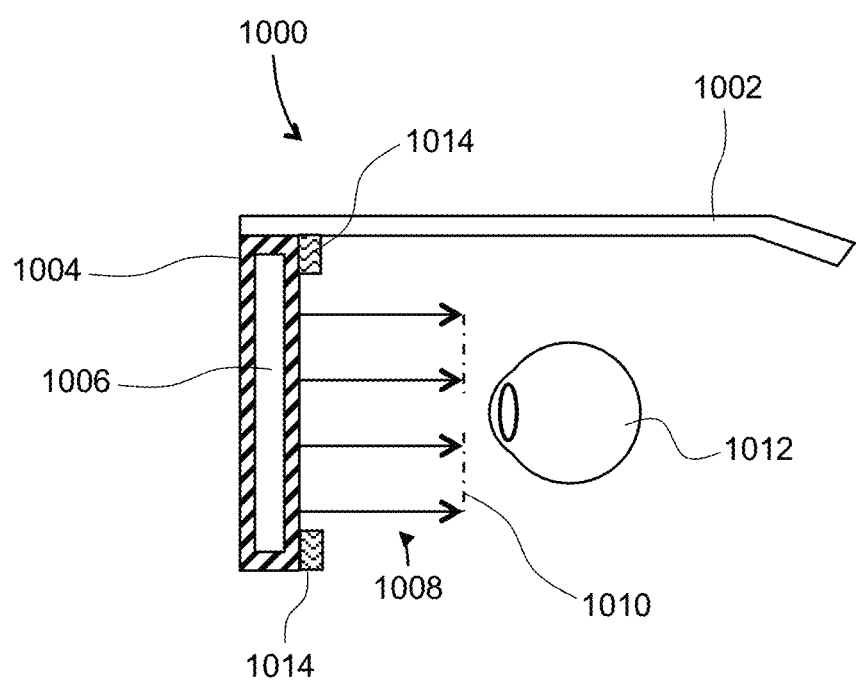
FIG. 10B is a side cross-sectional view of the AR/VR display of FIG. 10A.

Referring to FIGS. 10A and 10B, a near-eye display 1000 includes a body or frame 1002 having a form factor of a pair of eyeglasses. A display unit 1004 may include a display assembly 1006 (FIG. 10B), for example the near-eye display assembly 100 of FIG. 1, the near-eye display assembly 500 of FIG. 5, the optical assembly 800A of FIG. 8A, the optical assembly 800B of FIG. 8B, the optical assembly 800C of FIG. 8C, and/or the optical assembly 800D of FIG. 8D. The display assembly 1006 provides image light 1008 to an eyebox 1010, which is defined as a geometrical area where a good-quality image may be presented to a user's eye 1012.

An electronic display of the display assembly 1006 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye display 1000 may also include an eye-tracking system 1014 for determining, in real time, the gaze direction and/or the vergence angle of the user's eyes 1012. The determined gaze direction and vergence angle may be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. The near-eye display 1000 may include an audio system comprising small speakers or headphones.

Figure 11:
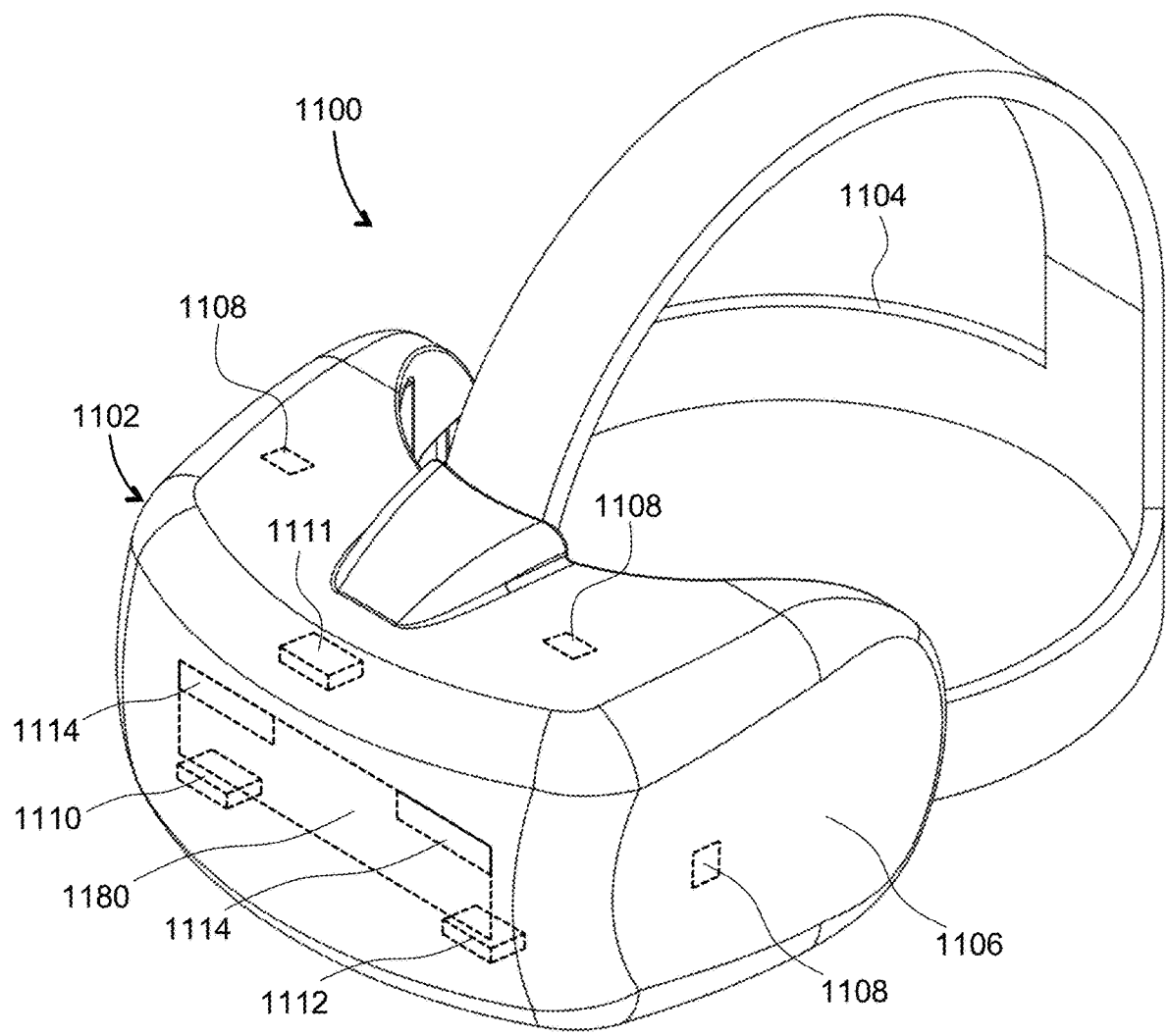
FIG. 11 is an isometric view of a head-mounted display incorporating a near-eye display assembly of the present disclosure.

Turning now to FIG. 11, an HMD 1100 is an example of a near-eye wearable display system enclosing user's face, for a greater degree of immersion into an AR/VR environment. HMD 1100 augments views of a physical, real-world environment with computer-generated imagery, and/or generates entirely virtual 3D imagery. The HMD 1100 may include a front body 1102 and a band 1104. The front body 1102 is configured for placement in front of eyes of a user in a reliable and comfortable manner, and the band 1104 may be stretched to secure the front body 1102 on the user's head. A display system 1180 may be disposed in the front body 1102 for presenting AR/VR imagery to the user. The display system 1180 may include any of the near-eye display assemblies of the present disclosure, including the near-eye display assembly 100 of FIG. 1, the near-eye display assembly 500 of FIG. 5, and/or the optical assemblies 800A, 800B, 800C, and 800D of FIGS. 8A, 8B, 8C, and 8D, respectively. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be external to the IMU 1110, internal to the IMU 1110, or some combination thereof.

The locators 1108 are traced by an external imaging device of a VR system, such that the VR system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual imagery to the user as the latter moves and turns in 3D space.

The HMD 1100 may further include a depth camera assembly (DCA) 1111, which captures data describing depth information of a local area surrounding some or all of the HMD 1100. To that end, the DCA 1111 may include a laser radar (LIDAR) or another suitable device. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the user's eyes also allows the HMD 1100 to determine the gaze direction of the user and to adjust the image generated by the display system 1180 accordingly. In some embodiments, the vergence, that is, the convergence angle of the user's eyes gaze, is determined. The determined gaze direction and vergence angle may be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

The hardware used to implement the various illustrative logics, logical blocks, modules, and circuits described in relation to the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the descriptions of the present disclosure are in the context of a particular implementation in a particular environment for a particular purpose, those of ordinary skill in the art will recognize that their usefulness is not limited thereto and that the present disclosure may be beneficially implemented in any number of environments for any number of purposes. Accordingly, the claims set forth below should be construed in view of the full breadth of the present disclosure.

What is claimed is:

1. A near-eye display assembly comprising:
an electronic display for providing image light;
a circular polarizer downstream of the electronic display for circularly polarizing the image light; and
a pancake lens downstream of the circular polarizer for conveying the image light to an eyebox;
wherein the circular polarizer comprises a first quarter-wave waveplate disposed between and spaced apart from the electronic display and the pancake lens; and
wherein the pancake lens comprises a pair of plano-convex lenses and a stack of a second quarter-wave waveplate and a reflective polarizer sandwiched between flat sides of the pair of plano-convex lenses.

2. The near-eye display assembly of claim 1, wherein the circular polarizer is spaced apart from the electronic display and the pancake lens by air gaps.

3. The near-eye display assembly of claim 1, wherein the circular polarizer is tilted w.r.t. an optical axis of the pancake lens.

4. The near-eye display assembly of claim 1, wherein the circular polarizer has curved outer optical surfaces, wherein the circular polarizer has a substantially zero optical power for transmitted light.

5. The near-eye display assembly of claim 1, wherein the first quarter-wave waveplate is disposed closer to the pancake lens than to the electronic display.

6. A near-eye display assembly comprising:
an electronic display for providing image light;
a circular polarizer downstream of the electronic display for circularly polarizing the image light; and
a pancake lens downstream of the circular polarizer for conveying the image light to an eyebox;
wherein the circular polarizer comprises a first quarter-wave waveplate disposed between and spaced apart from the electronic display and the pancake lens; and
wherein the pancake lens comprises a pair of plano-convex lenses with convex sides facing the electronic display, a second quarter-wave waveplate, and a reflective polarizer disposed downstream of the pair of plano-convex lenses.

7. The near-eye display assembly of claim 6, wherein the first quarter-wave waveplate is disposed within 25% of the middle between the electronic display and the pancake lens.

8. The near-eye display assembly of claim 1, wherein the first quarter-wave waveplate comprises an anti-reflective coating facing the pancake lens.

9. The near-eye display assembly of claim 8, wherein the circular polarizer further comprises a linear polarizer upstream of and in contact with the first quarter-wave waveplate.

10. The near-eye display assembly of claim 8, wherein the anti-reflective coating has reflectivities at wavelengths of red, green, and blue color channels differing by less than 50% of the reflectivity at the wavelength of the green color channel.

11. An optical assembly comprising a polarization stack and a pancake lens subassembly separated from the polarization stack by an air gap;
wherein the polarization stack comprises in sequence: an air-facing linear polarizer, a first quarter-wave waveplate in contact with the linear polarizer, and an air-facing anti-reflective coating on a surface of the first quarter-wave waveplate facing the pancake lens subassembly, wherein a transmission axis of the linear polarizer is disposed at 45 degrees w.r.t. an optic axis of the first quarter-wave waveplate; and
wherein the pancake lens subassembly comprises a first plano-convex lens having a partially reflective coating on its convex side facing the polarization stack.

12. The optical assembly of claim 11, wherein the pancake lens subassembly further comprises in sequence: a second quarter-wave waveplate in contact with a flat side of the first plano-convex lens, a reflective polarizer having a transmission axis at 45 degrees w.r.t. an optic axis of the second quarter-wave waveplate, and a second plano-convex lens having a flat side in contact with the reflective polarizer.

13. The optical assembly of claim 11, wherein the pancake lens subassembly further comprises:
a second plano-convex lens having a convex side facing towards the polarization stack;
a second quarter-wave waveplate; and
a reflective polarizer downstream of the second quarter-wave waveplate and in contact with a flat side of the second plano-convex lens, the reflective polarizer having a transmission axis at 45 degrees w.r.t. an optic axis of the second quarter-wave waveplate.

14. A method for coupling image light emitted by an electronic display to an eyebox of a near-eye display, the method comprising:
circularly polarizing the image light by a circular polarizer comprising a first quarter-wave waveplate spaced apart from the electronic display, to produce circularly polarized image light; and
conveying the circularly polarized image light to the eyebox by a pancake lens spaced by an air gap from the first quarter-wave waveplate;
wherein conveying the image light comprises propagating the image light in sequence through a first plano-convex lens, through a stack of a second quarter-wave waveplate and a reflective polarizer, and through a second plano-convex lens.

15. The method of claim 14, wherein the circular polarizer is spaced apart from the electronic display by an air gap.

16. The method of claim 14, further comprising disposing the first quarter-wave waveplate closer to the pancake lens than to the electronic display.

* * * * *